J. F. STACHOWSKI.
BEARING.
APPLICATION FILED NOV. 28, 1919.
1,350,245.  Patented Aug. 17, 1920.
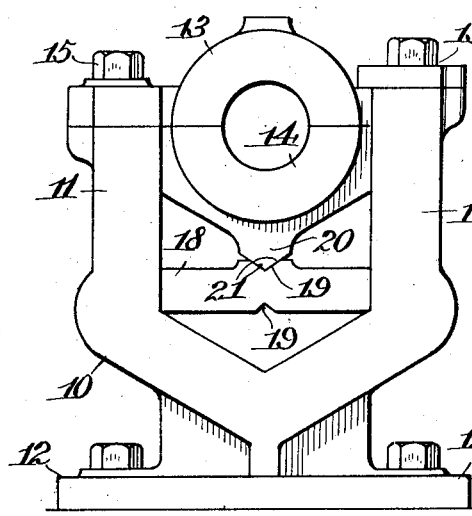
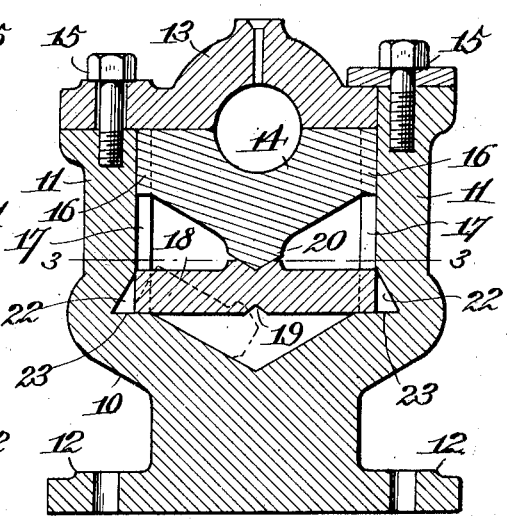
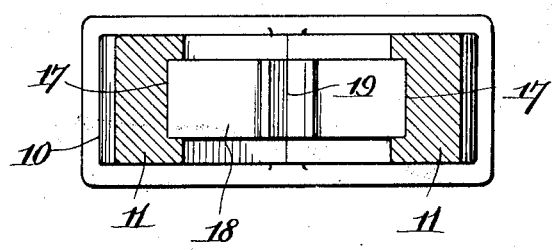
Inventor,
Joseph F. Stachowski
By Victor J. Evans,
Attorney.

UNITED STATES PATENT OFFICE.

JOSEPH F. STACHOWSKI, OF NEW YORK, N. Y.

BEARING.

1,350,245.  Specification of Letters Patent.  Patented Aug. 17, 1920.

Application filed November 28, 1919. Serial No. 341,105.

*To all whom it may concern:*

Be it known that I, JOSEPH F. STACHOWSKI, a citizen of the United States, residing at New York, in the county of New York and State of New York, have invented new and useful Improvements in Bearings, of which the following is a specification.

This invention relates to bearings.

Some of the objects of the invention are:—to produce a bearing which embodies a destructible or frangible element of a predetermined strength or load carrying capacity which is disposed in the bearing to sustain pressure up to a predetermined degree so that an excessive degree of pressure brought to bear upon certain parts of the bearing as correlated with the said frangible element will cause said element to break in lieu of a more expensive part or parts of the bearing; to produce a bearing which embodies a frangible element calculated to break in lieu of more expensive parts, at a time when the load supported thereby is excessive, to thus realize a gain as regards money expenditure for replacement of the destroyed parts—the breaking of parts as they now ordinarily occur cause a great loss of time in effecting repair, which should be capable of accomplishment with a very minimum delay, thus affecting materially the earning capacity of any machine which will be overcome in machines to which bearings of this type are applied. With these and other objects in view the invention resides in the particular provision and arrangement of parts hereinafter more fully described and illustrated in the accompanying drawings in which:—

Figure 1 is a side elevation of the bearing embodying the invention.

Fig. 2 is a central vertical sectional view.

Fig. 3 is a sectional view taken on the line 3—3 of Fig. 2.

Referring now to the drawing, it will be seen, that the bearing comprises a body member 10 which is substantially of U shape to provide parts 11—11. The body member is also provided with extensions 12—12 which are adapted to receive studs or the like for securing the bearing in place at the desired location. To provide for adjustment, the bearing is provided with parts 13 and 14 which form the shaft hole and as usual these parts are so constructed and are so disposed as to be divided on a line at right angles to the direction of the pressure which they are intended to sustain. The part 13 forms the cap and is provided with the usual oil hole and is secured as at 15—15 to the parts 11 of the body member 10. The part 14 which ordinarily supports the major portion of the stresses and strains and which carries the load, is provided with extensions 16—16 which are disposed in grooves 17—17 in the parts 11—11 of the body member and said part rests upon a frangible element 18 which in accordance with this invention is to support the load and which element in fact is of a predetermined strength and is capable of withstanding a predetermined degree of pressure. The frangible element properly sustains or supports the load so long as it is not excessive—excess load or pressure causing the element 18 to break. The element 18 is weakened or checked as at 19 by virtue of which the load carrying capacity or strength of said element may be brought to a predetermined degree. The checking of said element therefore is to be understood, from the manner of application herein, as being significant of anything intended to bring about the characteristic which the element 19 is to have, namely, that it is to be capable of withstanding a predetermined degree of pressure. The part 14 is formed with a depending portion 20 which has beveled faces 21 to provide an apex which is received in one of the "checks" 19 of the element 18. Each of the grooves 17 is cut-away as at 22 which provides shoulders 23 upon which the ends of the member 18 rest and which cut-aways also permit parts of the member when the same is broken to move away as the part 14 moves down. The body member 10 is so formed as to permit the broken parts of the element 18 to fall far enough so as not to interfere with the downward movement of part 14. The opposite ends of the element 18 are disposed in the grooves 17—17, lateral displacement of said element being therefore prevented.

This invention has a wide range of application and it is to be understood that the showing herein in no way is to limit the invention, to such showing made but that its application may be carried out to the full and in accordance with the scope of the claims hereunto appended.

What is claimed as new is:—

1. A bearing comprising a body member which embodies grooves, a plurality of parts recessed to form a shaft hole, one of said parts having extensions thereon which are disposed in said grooves, a frangible element of predetermined strength having the ends thereof disposed in said grooves as and for the purpose specified.

2. A bearing including a body member, a plurality of parts recessed to form a shaft hole supported by said body member, one of said parts being arranged for sliding movement, and a separate element, weakened to a predetermined strength by its being checked, supporting said last mentioned part.

3. A bearing comprising a body member which provides spaced members, cut-aways in said members which define shoulders, a plurality of shaft hole forming parts, a frangible element of predetermined strength supported upon the said shoulders and having its ends extending into said cut-aways.

In testimony whereof I have affixed my signature.

JOSEPH F. STACHOWSKI.